Figure 1:
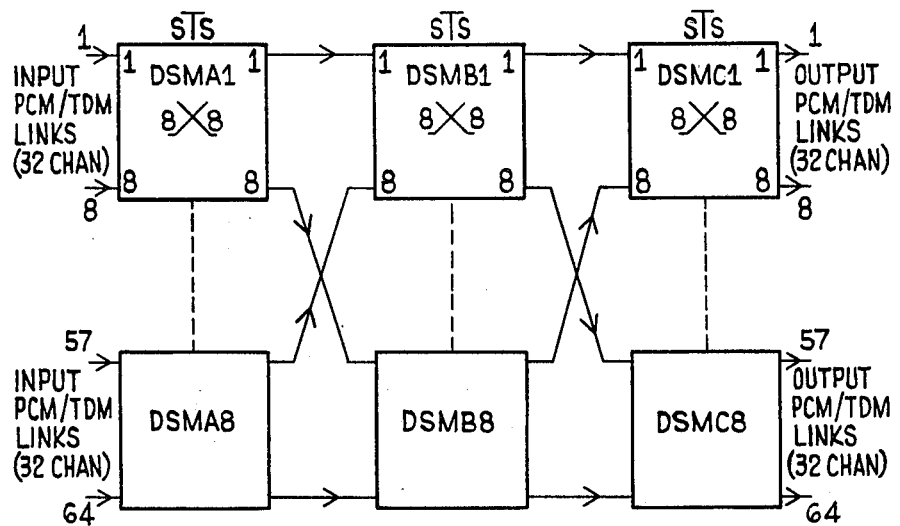

United States Patent [19]

Philip et al.

[11] 4,425,640

[45] Jan. 10, 1984

[54] TELECOMMUNICATIONS SWITCHING NETWORK USING DIGITAL SWITCHING MODULES

[75] Inventors: Alexander S. Philip; Thomas S. Maddern, both of Wimborne, England

[73] Assignee: The Plessey Company plc, Ilford, England

[21] Appl. No.: 255,487

[22] Filed: Apr. 20, 1981

[30] Foreign Application Priority Data

Apr. 24, 1980 [GB] United Kingdom ............... 8013555

[51] Int. Cl.³ .......................................... H04Q 11/04
[52] U.S. Cl. ........................................ 370/58; 370/64
[58] Field of Search .................... 370/58, 64, 112, 54, 370/63

[56] References Cited

U.S. PATENT DOCUMENTS 4,123,624 10/1978 Gagnier et al. ..................... 370/58
4,201,891 5/1980 Lawrence et al. .................. 370/58
4,344,170 8/1982 Arita .................................. 370/66

FOREIGN PATENT DOCUMENTS 2014018 8/1979 United Kingdom .

OTHER PUBLICATIONS

"Limitation of Transmission Rate in High-Speed TDM-Switching Networks Using Schottky-TTL Circuit Technology", by Pfannschmidt, Lehrstuhl, Für Nachrichtensysteme, Technische Universitat Braunschweig, Brunswick, Germany, pp. C3.1–C3.6.

*Primary Examiner*—Douglas W. Olms
*Attorney, Agent, or Firm*—Fleit, Jacobson, Cohn & Price

[57] ABSTRACT

It has been proposed to base advanced Digital Switching networks on a modular array using Digital Switch Modules (DSM). It has been found, for large traffic handling Digital switching systems, that the cross-office delay encountered in multi-stage networks based on 8×8 Digital Switching Modules (DSM's) is unacceptably large. To maintain the flexibility provided by the multi-stage concepts a demultiplexing/mixing/remultiplexing stage (DMR) is introduced to replace intermediate DSM ranks. The DMR is used to provide a preset time/space switching function within the total trunking providing the availability of a controlled stage but without the control and delay penalties associated with a fully flexible DSM or the control and link blocking disadvantages associated with a pure space switch. The DMR effectively acts as a pre-programmed or counter driven DSM. By adjusting the degree of DMR function it is possible to provide a very wide range of switch sizes which uses a common organization in the controlled switch stages. The operation of the DMR may be defined in conjuction with a mirror imaging correlation function to provide a constant switch loop delay for duplex connections.

10 Claims, 18 Drawing Figures

|   | INPUTS | | | | | | | |
|---|---|---|---|---|---|---|---|---|
|   | 1 | 2 | 3 | 4 | 5 | 6 | 7 | 8 |
| 1 | A | B | C | D | E | F | G | H |
| 2 | B | A | D | C | F | E | H | G |
| 3 | C | D | A | B | G | H | E | F |
| 4 | D | C | B | A | H | G | F | E |
| 5 | E | F | G | H | A | B | C | D |
| 6 | F | E | H | G | B | A | D | C |
| 7 | G | H | E | F | C | D | A | B |
| 8 | H | G | F | E | D | C | B | A | a  8×8 DMR  C1=1  C0=1

|   | INPUTS | | | | | | | |
|---|---|---|---|---|---|---|---|---|
|   | 1 | 2 | 3 | 4 | 5 | 6 | 7 | 8 |
| 1 | A | B | C | D | A | B | C | D |
| 2 | B | A | D | C | B | A | D | C |
| 3 | C | D | A | B | C | D | A | B |
| 4 | D | C | B | A | D | C | B | A |
| 5 | A | B | C | D | A | B | C | D |
| 6 | B | A | D | C | B | A | D | C |
| 7 | C | D | A | B | C | D | A | B |
| 8 | D | C | B | A | D | C | B | A | b  4×4 DMR  C1=1  C0=0

|   | INPUTS | | | | | | | |
|---|---|---|---|---|---|---|---|---|
|   | 1 | 2 | 3 | 4 | 5 | 6 | 7 | 8 |
| 1 | A | B | A | B | A | B | A | B |
| 2 | B | A | B | A | B | A | B | A |
| 3 | A | B | A | B | A | B | A | B |
| 4 | B | A | B | A | B | A | B | A |
| 5 | A | B | A | B | A | B | A | B |
| 6 | B | A | B | A | B | A | B | A |
| 7 | A | B | A | B | A | B | A | B |
| 8 | B | A | B | A | B | A | B | A | c  2×2 DMR  C1=0  C0=1

|   | INPUTS | | | | | | | |
|---|---|---|---|---|---|---|---|---|
|   | 1 | 2 | 3 | 4 | 5 | 6 | 7 | 8 |
| 1 | A | A | A | A | A | A | A | A |
| 2 | A | A | A | A | A | A | A | A |
| 3 | A | A | A | A | A | A | A | A |
| 4 | A | A | A | A | A | A | A | A |
| 5 | A | A | A | A | A | A | A | A |
| 6 | A | A | A | A | A | A | A | A |
| 7 | A | A | A | A | A | A | A | A |
| 8 | A | A | A | A | A | A | A | A | d  1×1 DMR  C1=0  C0=0

Fig. 18

TELECOMMUNICATIONS SWITCHING NETWORK USING DIGITAL SWITCHING MODULES

The present invention relates to telecommunications systems employing digital switching techniques.

Figure 14:
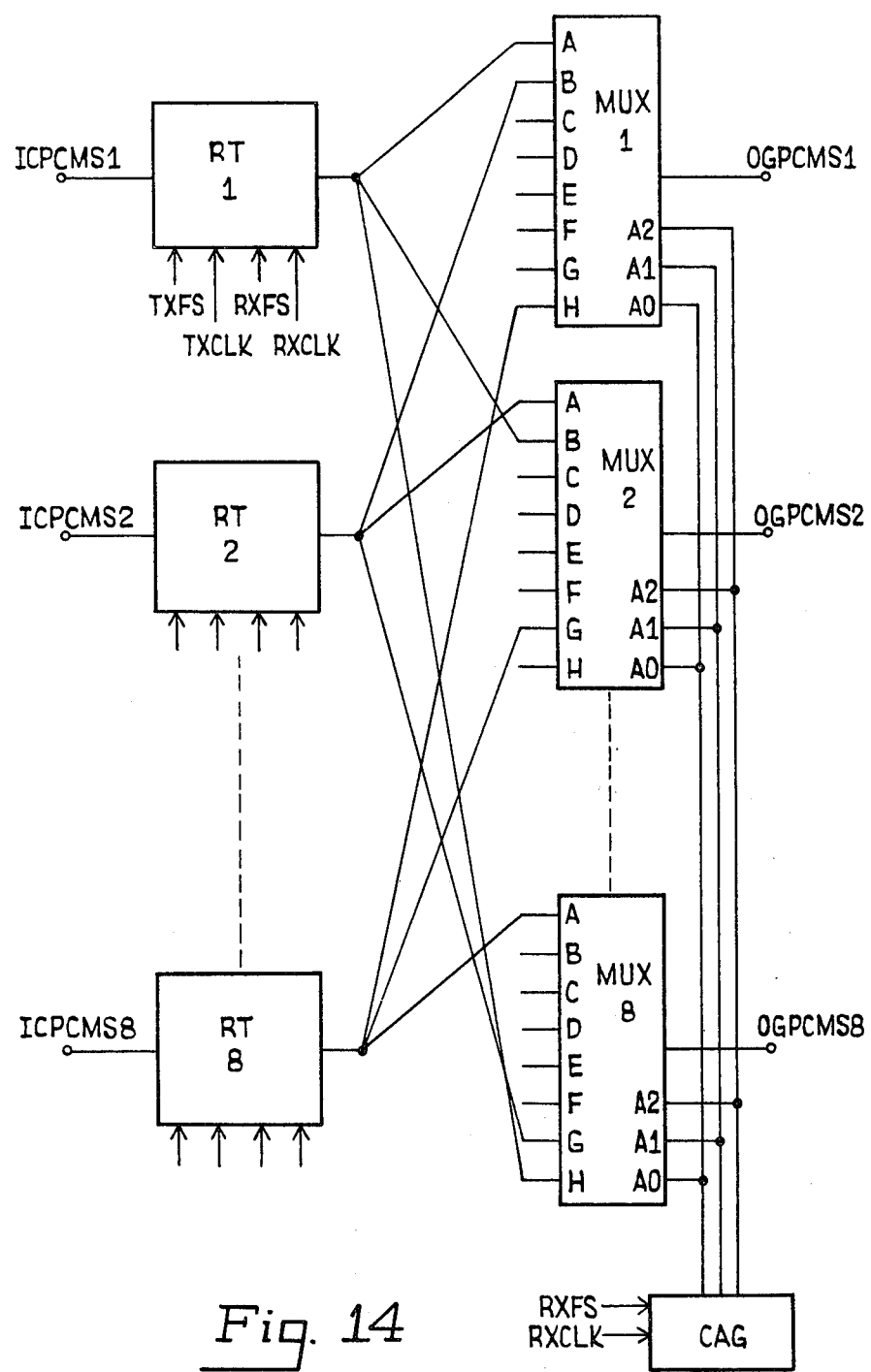

It has been proposed to construct a digital switching network handling pulse code modulated digital links using so-called digital switching modules. Each digital switching module comprises serial-to-parallel conversion, a speech store, a control store and parallel-to-serial conversion. One particular implementation of a digital switching module is disclosed in a paper entitled "Development of a time division switching network usable in a very large range of capacities" given by P. Charransol, J. Hauri, C. Athenes and D. Hardy at the 1978 International Seminar of Digital Communication convened by the I.E.E.E. in the United States of America. The digital switching module is shown in FIG. 14 of the above paper and it is implemented using two stores, one for speech samples and the other for control (i.e. time and space switching) purposes with serial-to-parallel converters on the input paths and parallel-to-serial converters on the output paths to provide an 8×8 digital switching module. All the incoming channels (say 32) on each of the eight incoming p.c.m. links served by the digital switching module are written cyclically into the data store every frame period. The speech store address is arranged to correspond to the input channel number. Reading of the speech store is under the control of the control store. The control store is read cyclically with its address corresponding to the output channel number. The contents of the control store are used to address the speech store for each channel. Accordingly the digital switching module controls the switching of input channels to output channels by the values placed in the control store. Each module serves 256 input and output channels necessitating an eight bit control word for each switching operation. The actual interconnections are specified by the overall switching network control system which causes the necessary control store location to be programmed with the required speech store location address.

In the above mentioned paper, it is shown how digital switching modules (D.S.M.'s) implemented in large scale integrated circuit form can be used to form complex networks by arranging the D.S.M.'s in a matrix using a number of stages in series. For example, 2048 channels may be handled by a three stage matrix using twenty-four (three stages of eight D.S.M.'s each) digital switching modules. Larger sizes of switch network may be produced to handle increased traffic, for example by extension of the principle to further stages of switching such as 5, 7, 9 etc. However, the use of more than three stages of digital switching modules imports complexities into the path set-up arrangements while the increasing propagation delay imparted by the network.

It is an aim of the present invention to provide a multi-stage switching network for use in telecommunications switching systems using digital switching modules and comprising more than three stages of switching in which the disadvantages outlined above are minimised.

According to the invention there is provided a device having n input paths and n output paths for connection in n interstage links of a multi-stage telecommunication switching network using digital switching modules, wherein the device comprises n multiplexors each having one output and n inputs and each multiplexor provides one discrete output path for the device and each input path is connected to a corresponding input on each multiplexor and the multiplexors of the device are adapted to be controlled to connect a selected input to the corresponding output path in accordance with address information fed to the multiplexors from a cyclic address generator in the device and the cyclic address generator is preprogrammed with a fixed channel allocation address pattern arranged such that the channels on each input path are spread equally over the output path multiplexes without changing the position of the channels within a multiplex.

The use of a device such as defined above has the substantial advantage of considerably extending the switching network size, and therefore the traffic handling capacity of the network, without incorporating corresponding cost penalties. It provides a multi-stage network with reduced in-built delay from that which is found with a corresponding number of stages each employing D.S.M.'s.

The device may also be used to incorporate alignment elements on all input paths allowing a large switching network to be split into manageable physical modules which may be subjected to a wide range of physical separation without any delay compensation. In providing the aligner function two clock signals for input and output are used consisting of (a) a fine clock giving bit alignment and a course clock giving frame alignment. Only one timeslot (eight bit periods) per frame is required for frame alignment allowing the remaining time slots on the frame start lead to be used for other purposes if required. Using these spare timeslots on the course clock connections allows very efficient use to be made of intermodule cabling and may be used for control signalling purposes.

According to a feature of the invention the address generator is preprogrammed with a number of selectable channel allocation patterns. Typically the patterns are (i) complete availability between input and output links, (ii) segregation of the input and output links into two corresponding groups with complete availability within each group only, (iii) segregation of the input and output links into four corresponding groups with complete availability within each group only and so on in similar manner until (iv) dedicated connection between corresponding input and output paths on an exclusive basis.

In one embodiment of the invention n is equal to eight and the preprogrammed channel allocation patterns provide (i) an 8×8 space switch (ii) two 4×4 space switches (iii) four 2×2 space switches and (iv) eight 1×1 space switches. By providing for the adjustment of the degree of mixing between input and output paths it is possible to provide a very wide range of switch sizes and accordingly traffic handling capacities which stem from a common organisation. This is particularly significant when it is realised that, in say a five stage network, only the outer and central stages will be using digital switching modules (D.S.M.'s) and therefore only those stages will require network path connection control information extending to them.

The feature of making the degree of mixing selectable allows a switching network to be grown in simple and orderly manner without resorting to re-wiring of the network.

When the mixing is effectively switched off, by selection of 1×1 space switches, then it is possible to use the device solely for its re-alignment properties while use of common input and output clocks will provide a mixing only property.

Further, the operation of the device according to the invention may be defined in conjunction with a mirror imaging correlation function to provide a constant switch loop delay for duplex connections.

The device is also ideally suited for implementation in large scale integrated circuit form for use as a building block in exchange switching network using D.S.M.'s.

Figure 6:
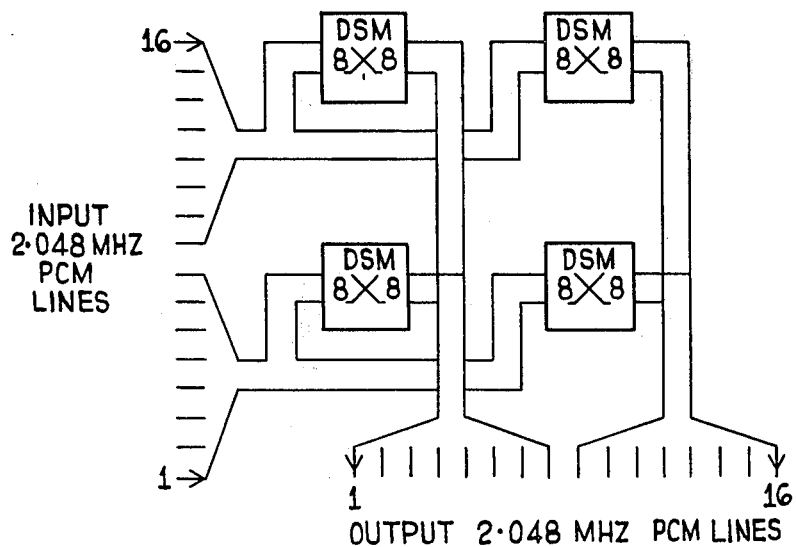
Figure 2:
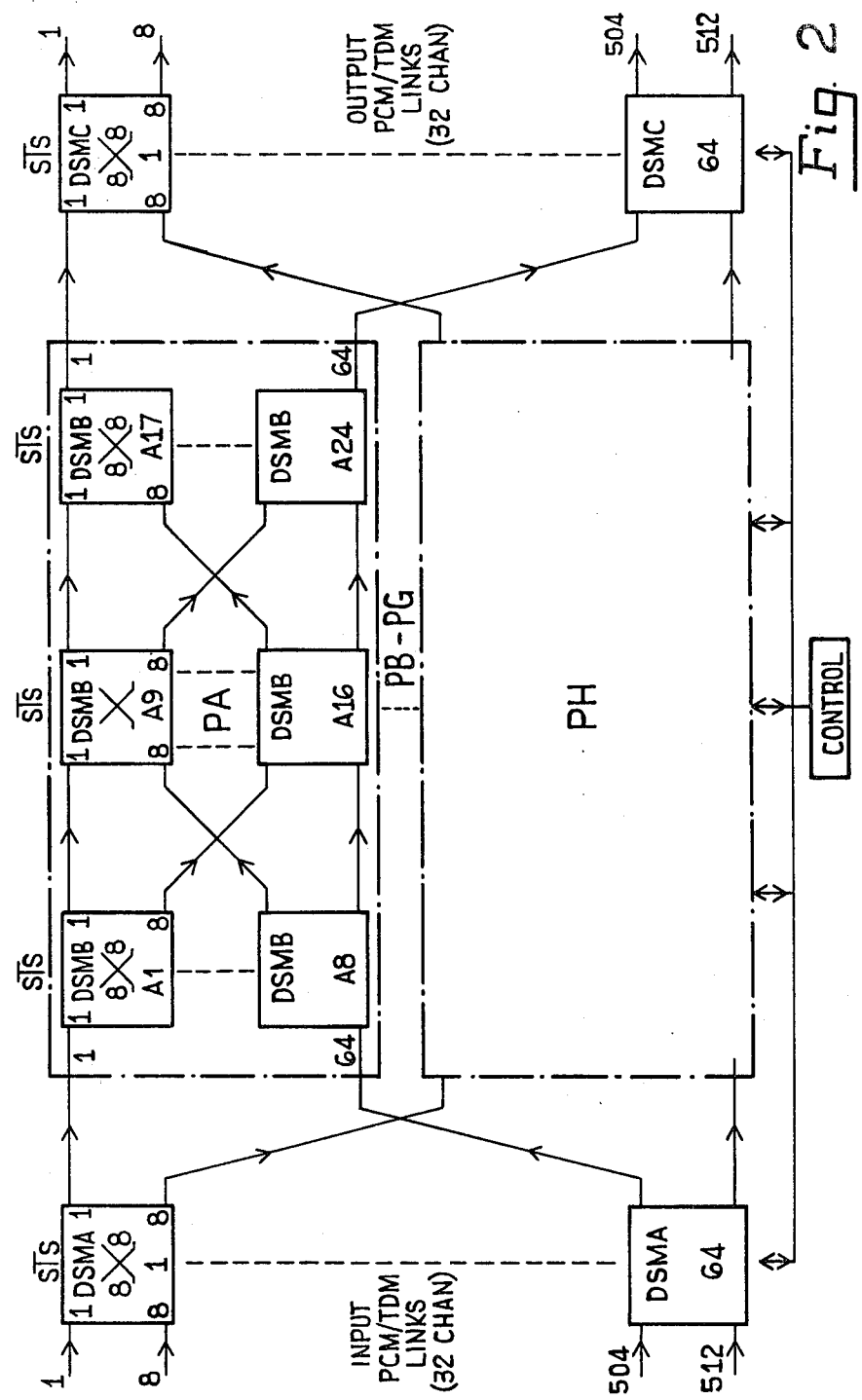
Figure 3:
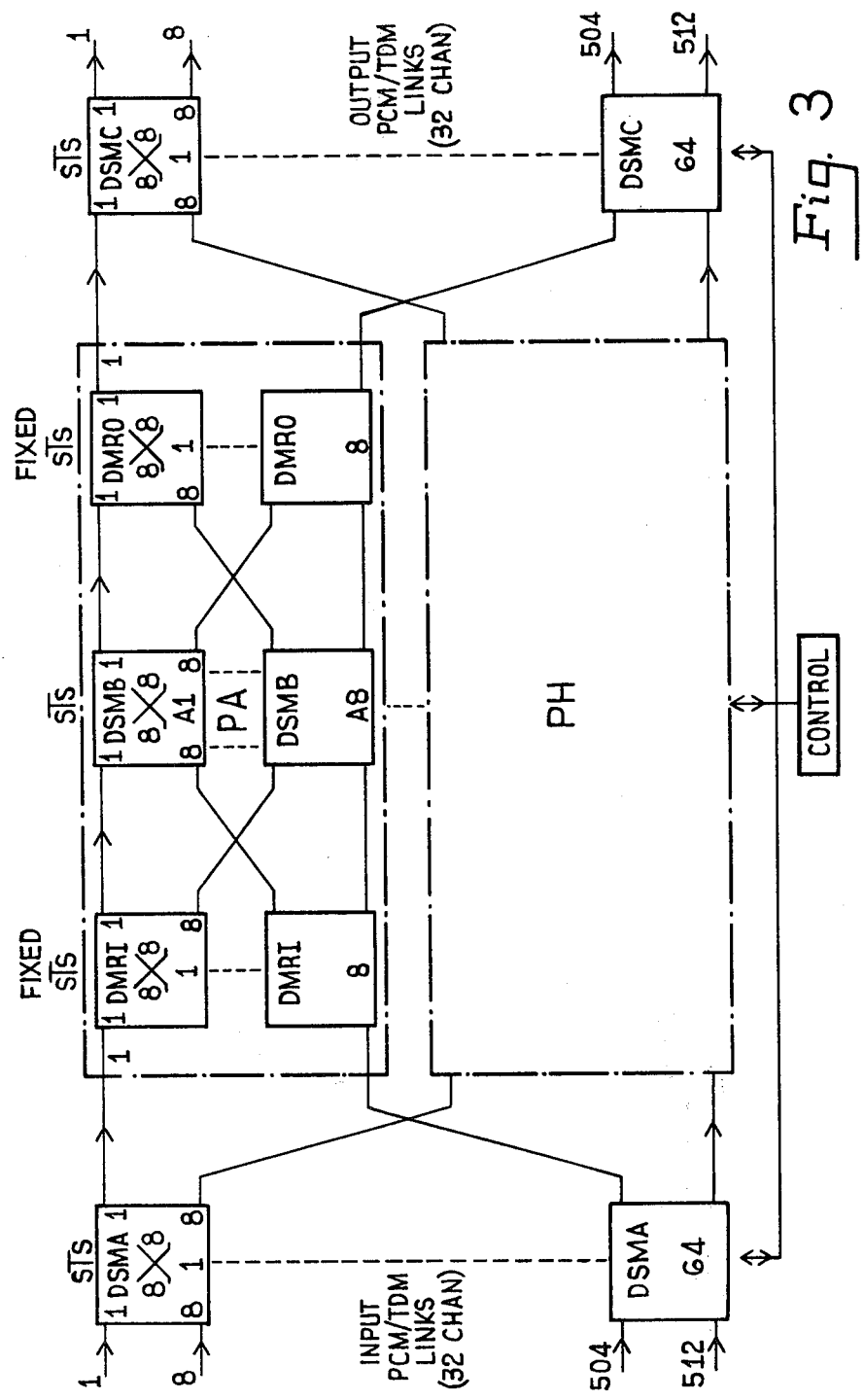
Figure 4:
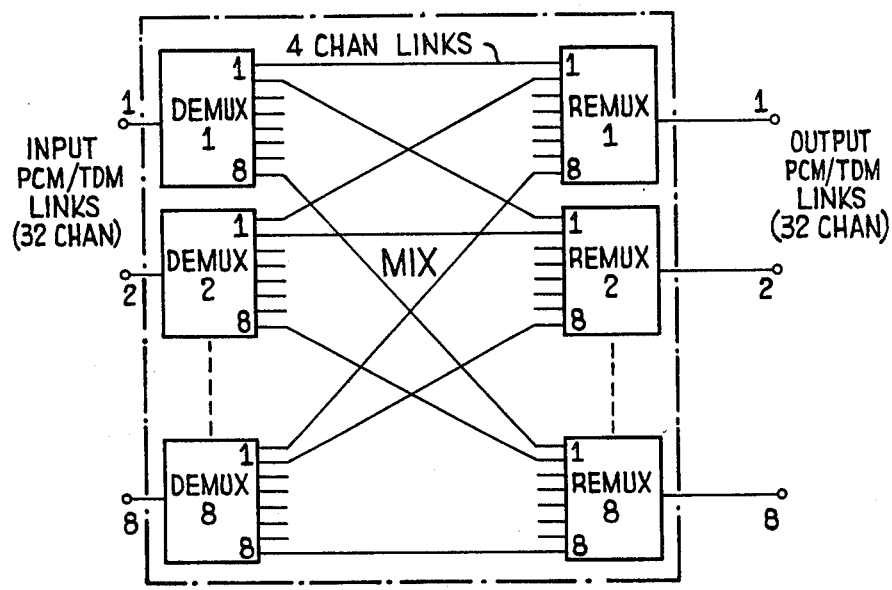
Figure 5:
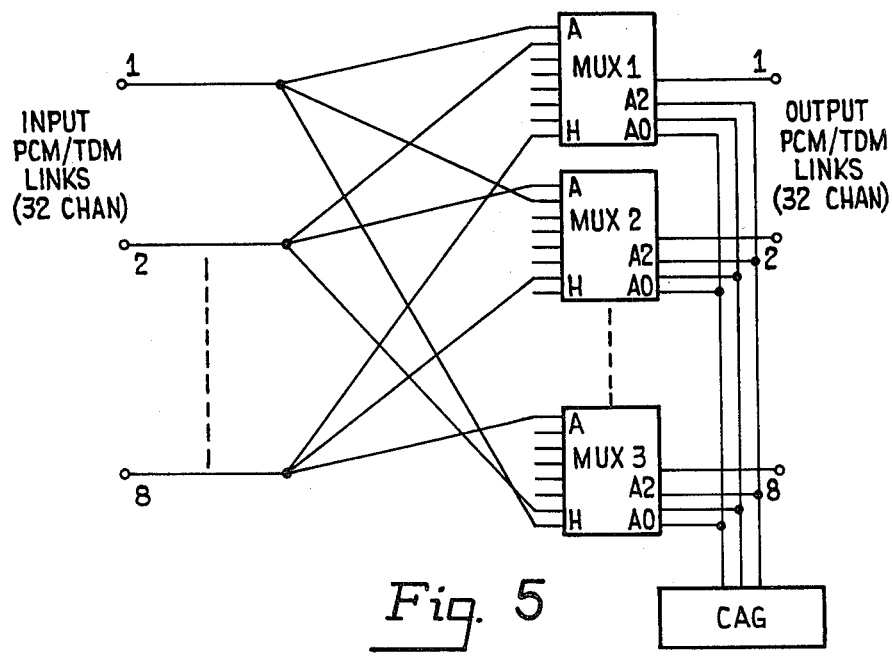
Figure 7:
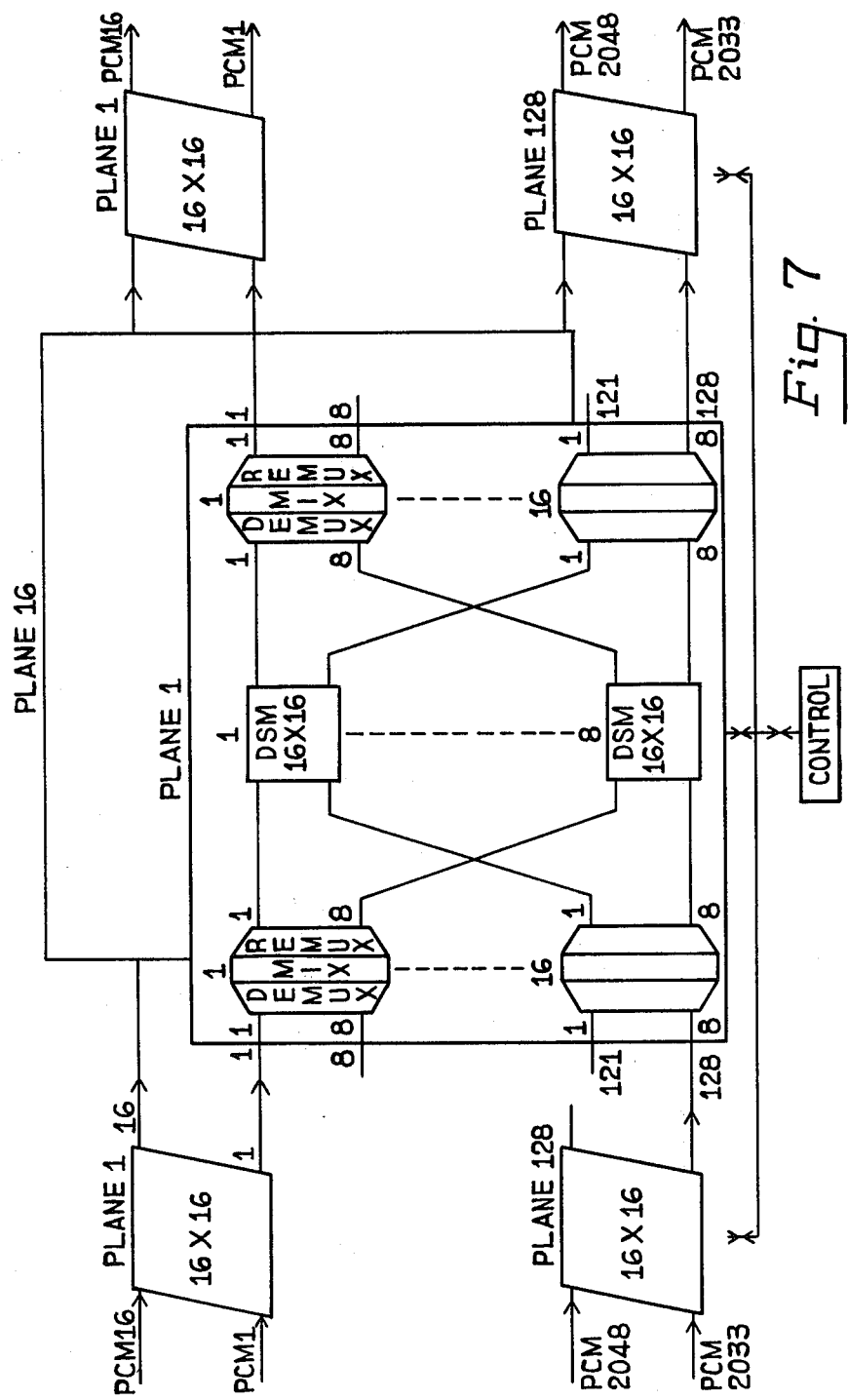
Figures 8, 10:
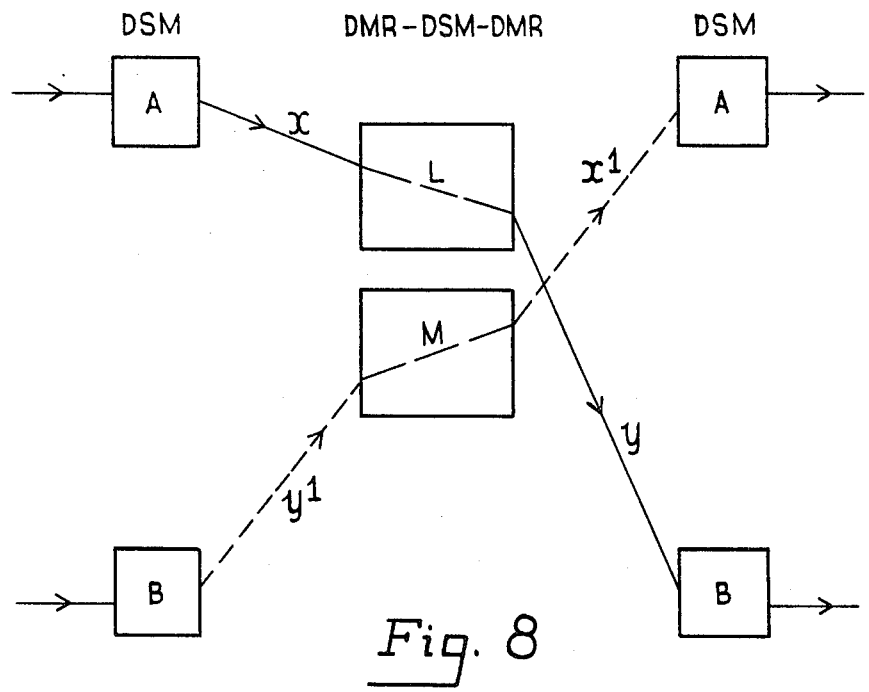
Figure 9:
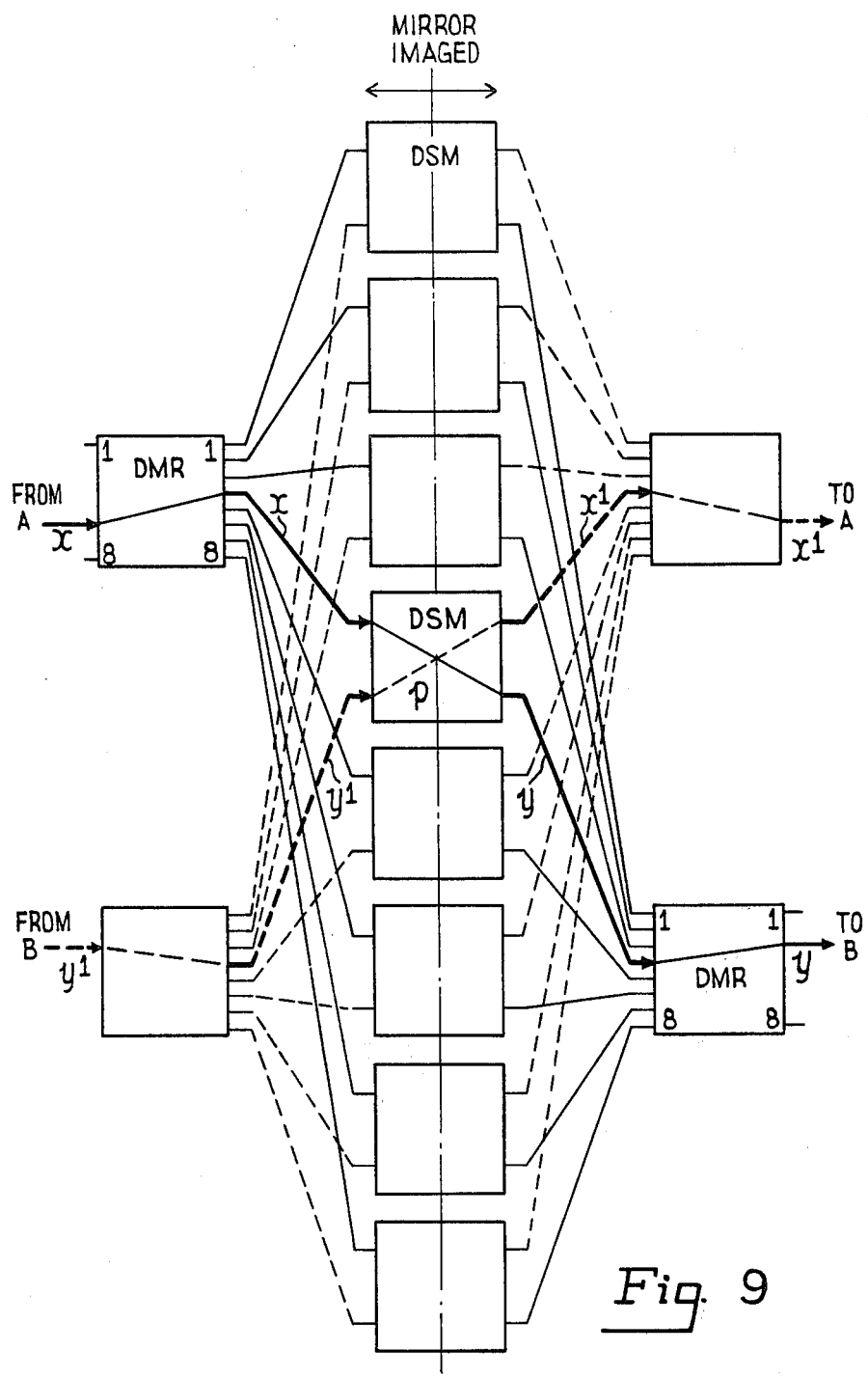
Figure 11:
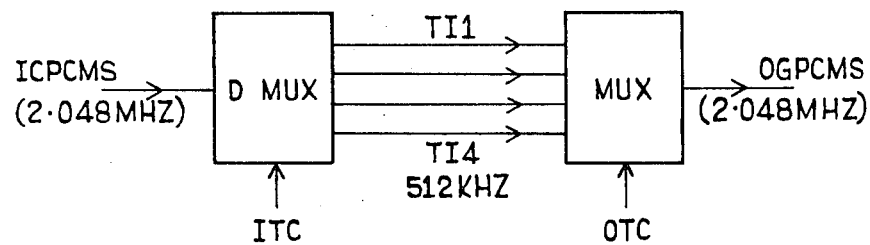
Figure 12:
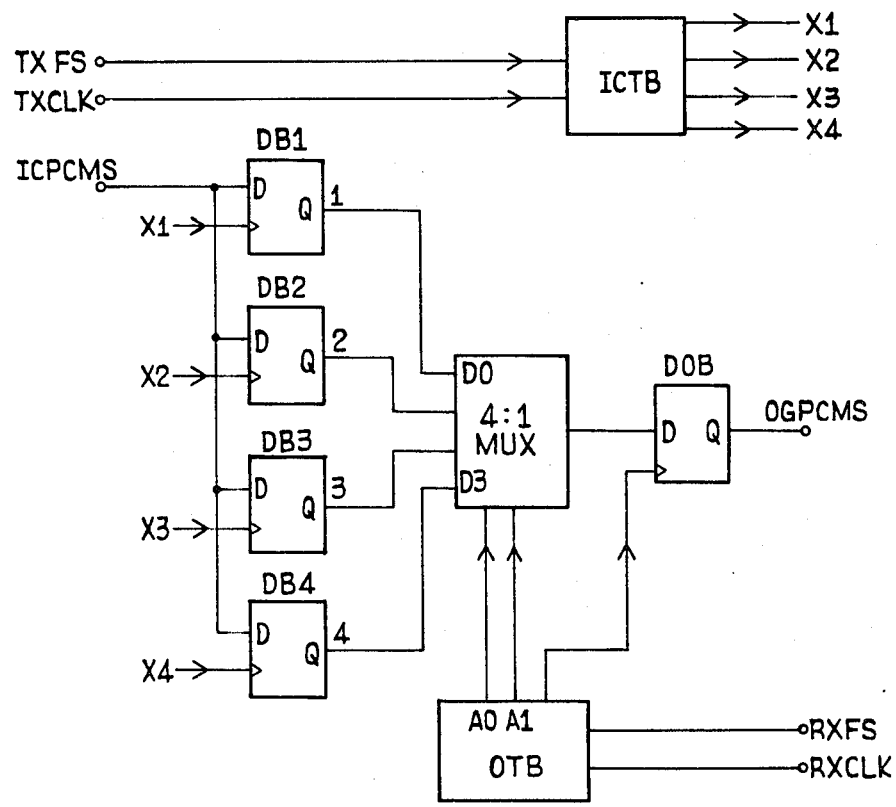
Figure 13:
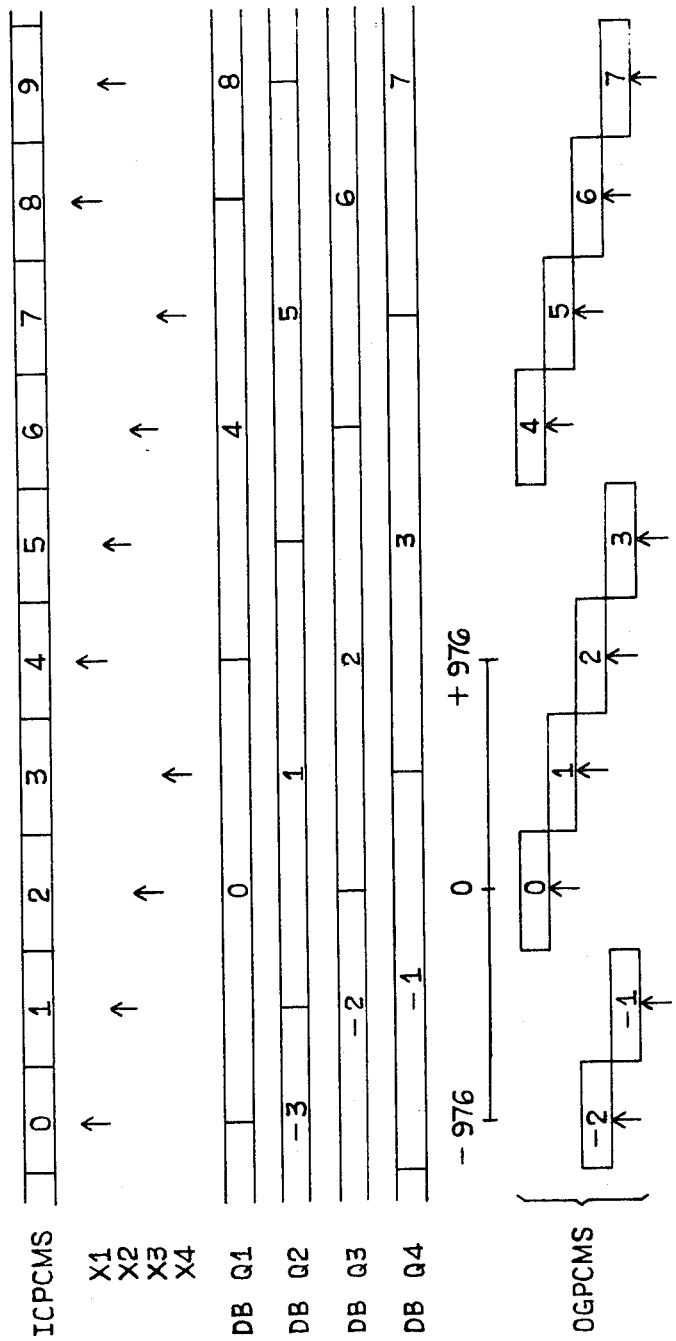
Figure 15:
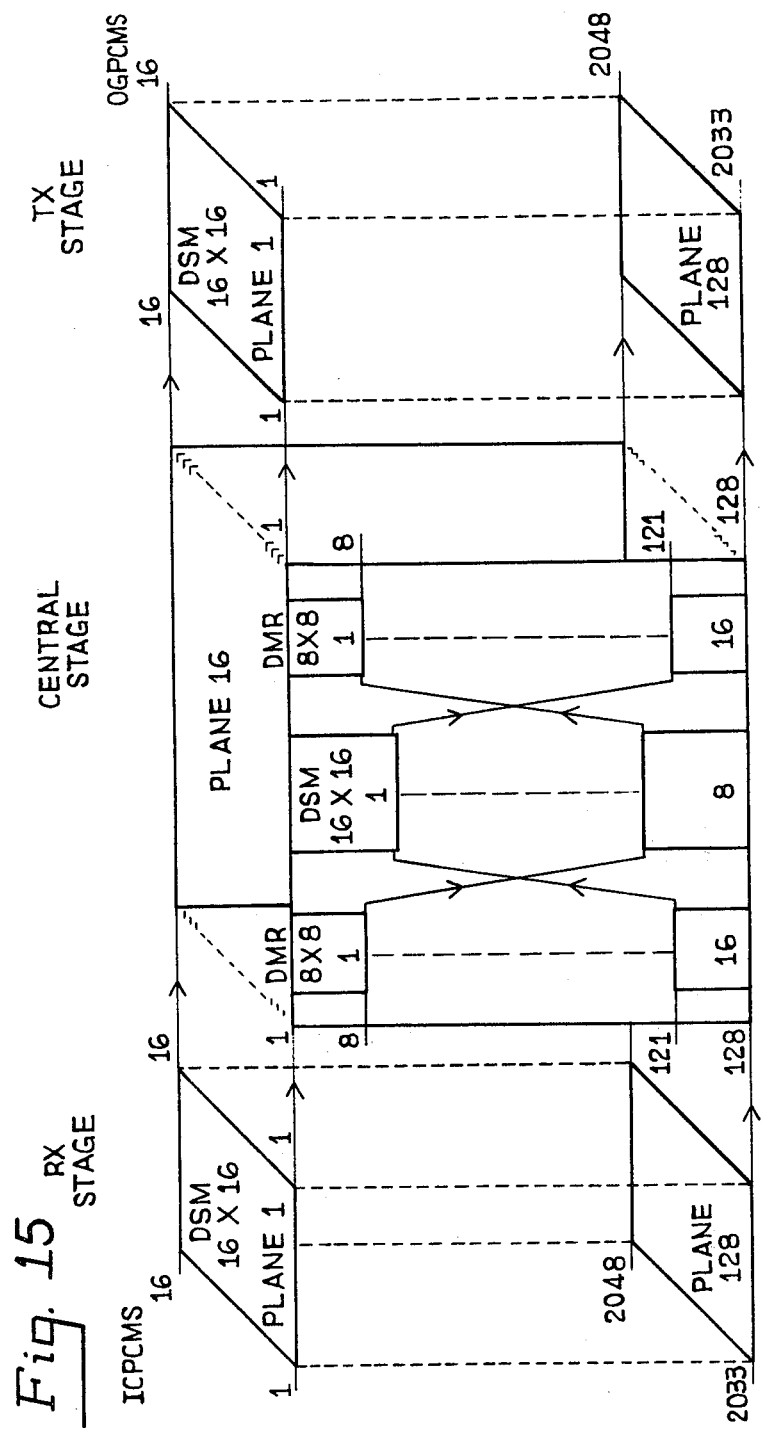
Figure 16:
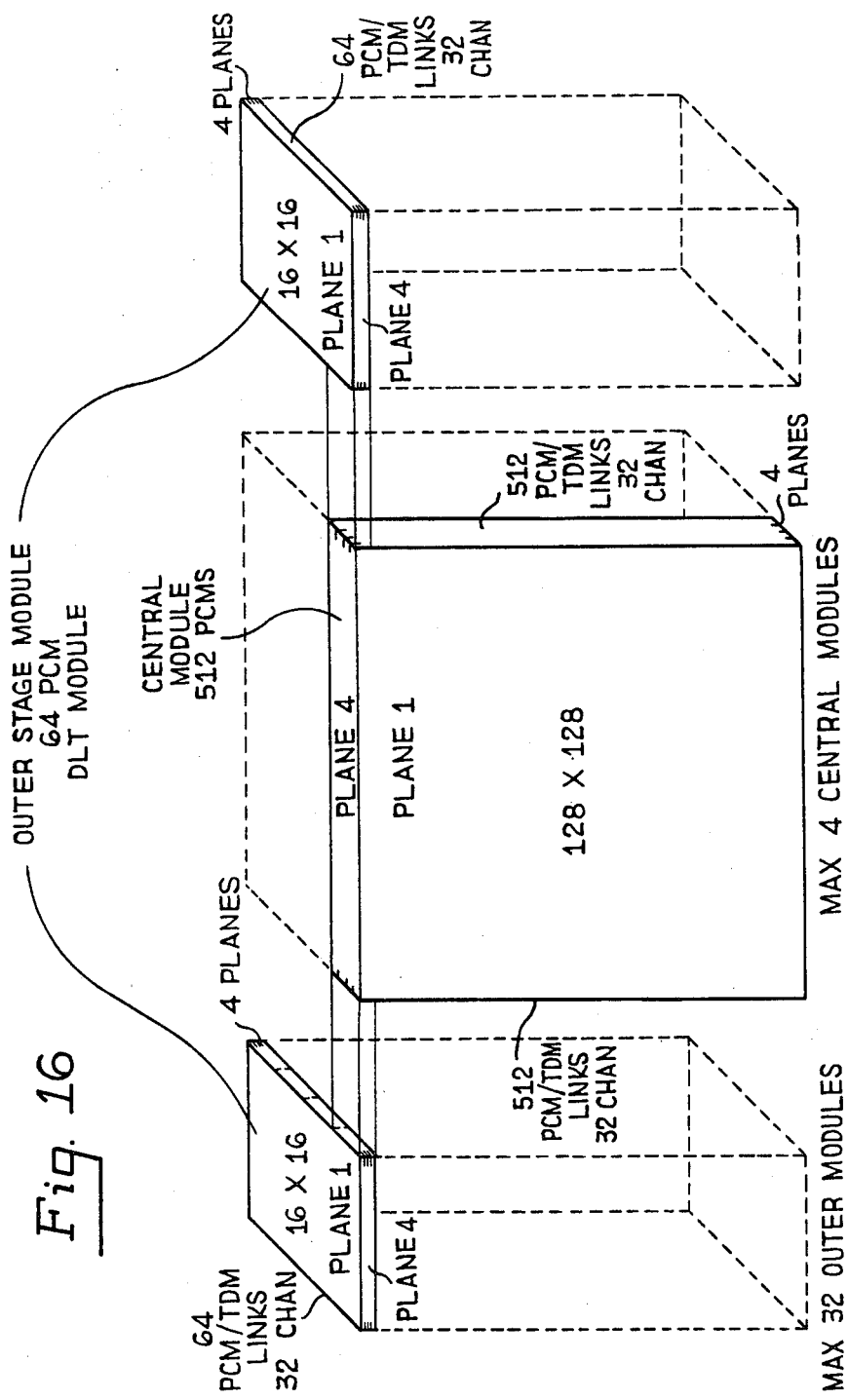
Figure 17:
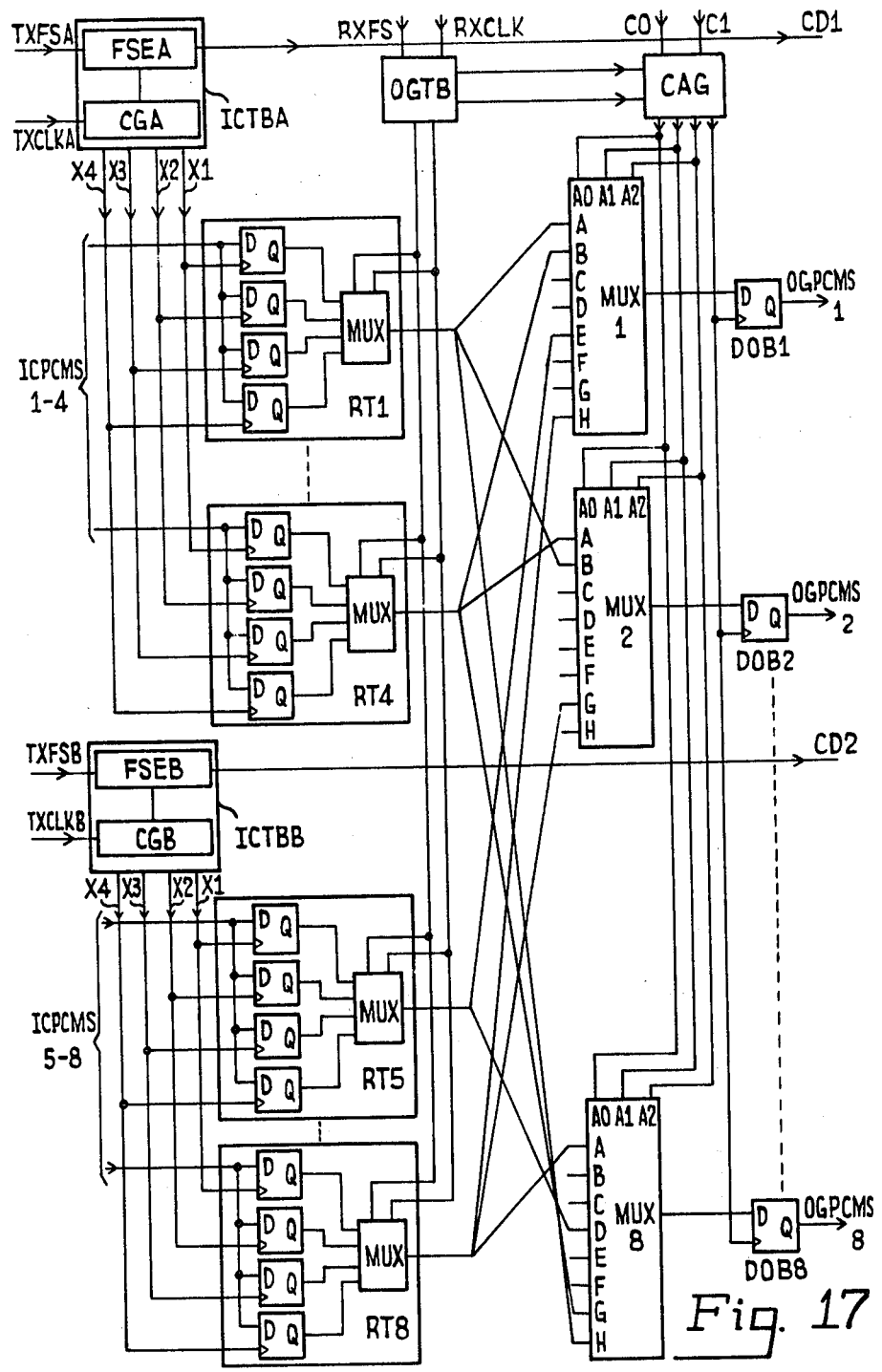

The invention, together with its various features will be more readily understood from the following descriptions of one embodiment which should be read in conjunction with the accompanying drawings. Of the drawings:

FIG. 1 Shows a block diagram of a switching network using digital switching modules, FIG. 2 Shows how the switching network of FIG. 1 can be expanded, FIG. 3 Shows how network of FIG. 3 is modified by the incorporation of devices according to the invention to reduce the control required without substantially reducing the availability of the network, FIG. 4 Shows a block diagram of the device according to one embodiment of the invention, FIG. 5 Shows one implementation of the device according to the invention, FIG. 6 Shows how a 16×16 p.c.m. switch can be constructed using digital switching modules, FIG. 7 Shows how the 16×16 switches can be used in a network incorporating devices according to the invention, FIG. 8 Shows in outline form the duplex path correlation function, FIG. 9 Shows the inner stages duplex path correlation, FIG. 10 Shows one possible allocation of device function suitable for use with duplex paths, FIG. 11 Shows how a 512 KHz transfer arrangement can be used to produce a 2.048 MHz interface, FIG. 12 Shows a retiming circuit for use in the devices of the invention, FIG. 13 Shows a timing diagram for use with the retiming circuit of FIG. 12, FIG. 14 Shows an 8×8 D.M.R. according to a further embodiment of the invention incorporating retiming, FIG. 15 Shows the trunking for 2.048 p.c.m. lines using the devices of the invention, FIG. 16 Shows how the equipment of FIG. 15 is segregated into modular form, FIG. 17 Shows the circuit diagram of the DMR device and FIG. 18 Shows the table for the DMR selection options.

Referring firstly to FIG. 1, it will be recalled that a switching network can be constructed using digital switching modules (DSM) switching 256 channels. Each DSM can be implemented by using two stores allowing 8 binary data bits to be carried for each channel. All the channels are cyclically written into the data store every frame period. The data store address corresponds to the input channel number. Reading of data is performed by use of the control store. The control store is read cyclically, its address corresponding to the output channel number. The contents of the control store is used to address the data during read operations. Thus it is possible to control the switching of input channels to output channels by the values placed in the control store. Since 256 different input channels can be selected, the control store must be 8 bits wide. A ninth bit may be used to indicate the absence of any connection to an output channel.

The serial switch can be constructed by placing a serial-to-parallel highway converter on the input of a parallel switch and a parallel-to-serial converter on the output. Each line into and out from the D.S.M. carries 32 time multiplexed channels.

The serial switching module has used some of its time switching to provide an element of spacial switching and multiple modules can be interconnected to form larger sizes of switch. This is illustrated in FIG. 1, where 2048 channels are switched in a three stage structure sTs—sTs—sTs using 24 switch modules DSMA1 to 8, DSMB1 to 8 and DSMC1 to 8 arranged in a three stage A, B, C type of network. Larger sizes of switch may be produced by extension of the principle to further stages of switching (5, 7, 9 etc). Above three switching stages, path set-up become more complex and the propagation delay is increased.

An example of a 5 stage switch for 16,384 channels employing 320 switching modules is shown in FIG. 2. It can be seen that any particular path across the switch has a choice of 1 DSM for the 1st (DSMA1 to 8) and 5th (DSMC1 to 8) stages 8 DSM's for the 2nd and 4th stage (one DSM in each of the eight planes PA to PH) and 64 DSM's for the 3rd stage (any one of the eight centre DSMs in each of the eight planes). The full variability of the 2nd and 4th stages provides a degree of freedom not entirely essential, resulting in a blocking probability lower than necessary for practical applications. The prime characteristic of the 2nd and 4th stages is in giving access to all of the central (3rd stage) switching modules.

An identical size switch shown in FIG. 3, has a very similar five stage structure, in giving this access to the central elements, but uses fixed relationships switching modules according to an embodiment of the invention for the 2nd and 4th stages. These fixed relationship modules are implemented using either a specially configured device or a variable switching module which is set to a fixed switching configuration.

The fixed switching stages perform a "demultiplex-mix-remultiplex" operation spreading the channels on each input multiplex equally over the output multiplexes. In this example the 32 channels on one input multiplex, are split into 8 groups of 4 channels; one group appearing at each of the output multiplexes. FIG. 4 illustrates the 8 input 8 output demultiplexer-mix-remultiplexer function.

A simple pure space-switching DMR function can be implemented using eight eight-input data multiplexors MUX1 to MUX8 and a cyclic address generator CAG as shown in FIG. 5. With such a DMR function propagation delay in the 2nd and 4th stages of a five stage switching network is eliminated. In addition control information is only required for the 1st, 3rd and 5th stages, thereby simplifying the control interface with the network.

Use of the fixed stages in a switching network also using DMS's, however, increases the probability of blocking as indicated by a simple analysis below:

(i) Five stages all switching modules sTs—sTs—sTs—sTs—sTs

Blocking probability at an average circuit load $\tau$ $$\sim \{1-(1-\tau^{32})^2[1-(1-(1-\tau^{32})^2)^8]\}^8$$

$\tau = 0.8$ gives $4.0 \times 10^{-23}$ (ii) Five stages with DMR for 2nd and 4th stages sTs—s—sTs—s—sTs Blocking probability at an average circuit load $\tau$ $$\sim [1-(1-\tau^4)^2]^{64}$$

$\tau = 0.8$ gives $1.2 \times 10^{-12}$

For comparison a 3 stage switch of T-S-T structure of comparable size i.e. 256 channel time switches is much inferior than the 5 stage DMR structure as follows:
Blocking probability at an average circuit load $\tau$ $$\sim [1-(1-\tau)^2]^{256}$$

$\tau = 0.8$ gives $2.9 \times 10^{-5}$

From the above it can be seen a basic 256 channel switching module, with 8 inputs and 8 outputs, may be used in conjunction with a fixed relationships "demultiplexing-mixing-remultiplexing" device to provide the traffic handling capacity of a 5 stage structure whilst retaining the control simplicity and propagation delay associated with 3 stages. In achieving these advantages there has been some decrease of availability when compared to the rather academic values obtainable with the fully controlled 5 stage structure, but retains a value such superior, therefore, to that of a classical T - S - T architecture, using the same channel capacity time switching module.

This is just one very specific example of a more general approach in which the following may be varied to give the desired results:

(i) size of switching module in terms of both number of channels with full availability switching and the number of inputs and outputs.

(ii) size of DMR device (iii) type of DMR function (iv) number of switching stages.

In general a switch structure may be composed of many different numbers of stages and mixes of controlled switching modules and fixed relationships DMR modules, each providing varying characteristics in terms of, capacity of traffic handled, control complexity, propagation delay, grade of service and freedom of traffic flow. Of prime importance is the more general series of switch structures similar to the example described above in which there are $4n+1$ total stages ($n>o$) composed of alternate switching modules and DMR elements. These can be designed to allow full freedom of traffic flow with only $2n+1$ controlled stages.

When it is desired to employ a five stage structure for simplicity of control and minimisation of propagation delay, the switch traffic handling capacity can be increased by use of larger switching modules or DMR elements, while the converse holds for a decrease in size. One method of doubling the capacity of a basic 256 channel switching module is shown in FIG. 6.

If this technique is used for both central and outer switching stages a four fold increase can be obtained to provide a 65,536 channel switch as shown in FIG. 7.

The grade of service of this switch has also been improved and the blocking probability is given by $$\sim [1-(1-\tau^4)^2]^{128}$$

$\tau = 0.8$ gives $1.5 \times 10^{-24}$

A particular class of DMR function is derived below by means of an example for use where the majority of paths through the switch will be duplex as in a telecommunications application.

Call set-up and clear-down will be simplified if there is a correlation function between forward and return paths. After searching for a free path in one direction only, the return path will also have been defined. Careful choice of the correlation function will allow the switch loop delay of a duplex connection to be a fixed value. FIG. 8 shows how the overall path correlation can be applied for a forward path AB and a return path BA for a 5 stage switch. The input and output stages can be composed of DSMs arranged in square arrays to provide the larger sizes of switch. The central stages are really 3 stages internally DMR-DSM-DMR, again with the DSM organised in square arrays for the larger switch sizes. In order to make the connection AB, then all the central stages are inspected to find one which has both paths AL and LB free.

There are 32 time slots on each physical connection AL and LB, however, there is not independent choice of time slots on these two connections. A more detailed picture of the inner stages is given in FIG. 9 which allows this limitation to be identified. In the inner stages the input from A containing 32 time slots is equally distributed via a DMR to 8 DSM planes. There are 4 time slots used on each physical routing. The time slots allocated on the output of the DMR is a function of the position of the input A. In its simplest form the DMR provides no time switching, it acts purely as a fixed space switch. Thus the time slot x used on the route from A will be the timeslot used on the DMR output to the DSM plane p. In a similar manner time slot y will be used on the route to B and from the DSM on plane p to the DMR input. It is sensible to confine the input DMRs and output DMRs to have the same switching function. In general the time slot t used for passage through the DMR can be expressed as:

$$t = f(i, o) - (1)$$

where i is the physical input route and o is the physical output route. For each combination of i and o values there will be a choice of 4 time slots. To find a forward path through the inner stages it is necessary to locate a central DSM plane p which has both time slots x and y free. Thus the search is restricted to 4 input slots and 4 associated output time slots for each of the 8 DSM planes. This process can be repeated in a similar manner for all of the central sections corresponding to L through which it is possible to make an AB connection. The return path BA through central section M must now be considered. For ease of understanding it is assumed initially that L and M are coincident. In this case FIG. 9 would actually show the forward and return connections passing through one central section. If the input connections made are mirror imaged to the outputs and vice versa then $x = x^1$ and $y = y^1$. This mirror imaging does not reduce the freedom of choice in making a simplex path AB provided that A and B have not previously been used. This correlation function matches the connections required of the system. The forward delay dAB in time slots is given by, $$dAB = x - a + 16\left(1 - \frac{x-a}{|x-a|}\right)$$

$$+ y - x + 16\left(1 - \frac{y-x}{|y-x|}\right)$$

$$+ b - y + 16\left(1 - \frac{b-y}{|b-y|}\right)$$

where a is the time slot of termination A and b is the time slot of termination B. The return delay dBA in time slots is given by, $$dAB = y - b + 16\left(1 - \frac{y-b}{|y-b|}\right)$$

$$+ x - y + 16\left(1 - \frac{x-y}{|x-y|}\right)$$

$$+ a - x + 16\left(1 - \frac{a-x}{|a-x|}\right)$$

Thus the loop delay $dAB+dBA=96$ time slots or 3 frames.

In practice each stage will also have a real propagation delay which must be added. Since cancellation of this delay does not occur the loop delay is 3 frames plus 2 times the propagation delay in one direction.

If L and M are coincident then difficulty will be experienced when A and B are in the same DSM on the outer stages. If x is chosen to equal y then $x^1=y^1=x$. However, it is not possible to pass two channels in one time slot, so x cannot be allowed to equal y for cases where A and B are both in the same outer DSM. This does not imply that all 'own' DSM connections are blocked because x can be chosen to be different from y. For a duplex connection 2 input and 2 output time slots are required any way and provided they are available then it is of course possible to choose x and y to be different. The net effect then is to use up the time slots in pairs but this increases the blocking probability for such cases. It is possible to avoid this situation by making L and M different, but having a fixed relationship between them such as odd even pairing. This has the effect of applying a distorting function to the mirror imaging of inputs and outputs. An 'own' DSM full duplex connection thus will only require one time slot from each physical route and no restriction is placed on the choice of x and y.

Consideration must now be given to the constraints applied by the mirror imaging correlation to the DMR transfer function. Although different central sections L and M are used for forward and return paths similarly positioned central DSM elements p will be used in each case.

The general time slot transfer equation 1 may now be applied to the two paths

Forward Path:
$x = f(A, P)$  $y = f(P, B)$

Return Path:
$y^1 = f(B, P)$  $x^1 = f(P, A)$

The correlation function requires $x = x^1$ $y = y^1$

Hence $f(A, P) = f(P, A)$ $f(B, P) = f(P, B)$

More generally $f(i, o) = f(o, i)$

This function may be represented by a matrix. The only constraint applied by the equation is that it must be an orthogonal matrix where element $x_{io}=x_{oi}$. An example of such a DMR function is shown in FIG. 10. In FIG. 10 the references A–H are the time slot range over which an input is connected to an output. One possible allocation of A to H is as follows:

A = Channels 0, 8, 16 and 24
B = Channels 1, 9, 17 and 25
C = Channels 2, 10, 18 and 26
D = Channels 3, 11, 19 and 27
E = Channels 4, 12, 20 and 28
F = Channels 5, 13, 21 and 29
G = Channels 6, 14, 22 and 30
H = Channels 7, 15, 22 and 31

A specific size of DMR with 8 inputs and 8 outputs has been used for explanation, but the same principle can be applied to other sizes of square DMR.

The implementation of high traffic capacity multistage switches employing currently available technology will require subdivision of the switchblock into discrete modules with varying physical separation. When the intermodule transmission delay is of similar or greater magnitude than a bit timing period of the PCM/TDM links, great difficulty can be encountered in the distribution of timing waveforms and in the compensation of the propagation delays.

Custom LSI aligner circuits can greatly simplify intermodule communications offering automatic compensation over a wide range of separation. Splitting a 2.048Mb/s PCM/TDM link into four 512 Kb/s transfer interface lines TI1-4 would accommodate a nominal ±976 nano-second delay variation between input and output timing clock ITC and OTC as shown in FIG. 11. Generally other transmission rates may be used as required. Direct implementation would be inefficient in the use of links. It is possible to locate the demultiplexing and multiplexing circuitry at the receive module, providing timing information is transmitted along with the data link. A particular implementation is shown in FIG. 12. The transmit bit clock TXCLK is used to strobe information from the incoming p.c.m. system ICPCMS into the data binaries DB1 to 4 in a cyclic sequence governed by the transmit frame start clock TXFS acting upon the incoming time base ICTB. While the receive bit clock RXCLK enables the output register DOB to be loaded in a similar cyclic sequence via the multiplexer under the control of the receive frame start clock RXFS acting upon the output time base OCTB. The timing of the circuit is shown in FIG. 13. Such a retiming circuit is suitable for implementation in large scale integration form.

Switches which make use of a DMR function can benefit from the integration of both retiming and the demultiplex-mix-remultiplex operations into a single large scale integration device. An example of an 8×8 DMR with integral retiming is shown in FIG. 14 consisting of eight retimer circuits RT1-8 (each of which is similar to the circuit of FIG. 12) and eight output multiplexers MUX1-8. The clock inputs to the retiming circuits RT1-8 consist of the transmit time base (TXFS and TXCLK) and the receive time base (RXFS and RXCLK) and they may be commoned up as required. In such cases common timebase generators can be used. In most applications only one output timing reference RXCLK will be necessary and this can also drive the cyclic address generator CAG for the DMR function. The improved tolerance on the output timing can be achieved by placing the output binary of retiming circuit after the DMR mutiplexor.

The multistage switch architecture shown in FIG. 15, which uses the digital switching module in combination with a DMR function, can be considered as a three stage switch, consisting of one central stage and two outer stages. In fact the central stage actually consists of DMR—DSM—DMR.

A method of fragmenting this structure down into discrete modules is shown in FIG. 16. Since the outer stage module consists of 4 switching planes of 16×16 for both the receiving and transmitting stage, a maximum of 32 outer modules can be equipped. The central module consists of 4 super planes of 128×128 central stage and thus 4 replicas exist. From FIG. 16 it can be seen that 16 pcm/TDM lnks (32 chan) at 2.048 Mb/s are connected from any one outer module to any one central module. For transmission purposes the PCM/TDM links may be multiplexed up to 4.096 Mb/s, thus reducing the interconnection requirements to 8 data links plus 2 clocks for strobing and retiming. Where balanced line communication is used a 10 pair cable will be sufficient.

An example of a device which embodies all the functions of DMR, retiming and control signalling is shown in FIG. 17. This particular device has 8 data inputs ICPCMS1-8 subdivided into two groups of 4, each with their own input timing reference clocks ICLKA and ICLKB and 8 data outputs OGPCMS1-8 with a common timing reference OGTB. Both input frame synchronisation signals TXFSA and TXFSB are retimed to allow information to be embedded on the remaining non synchronisation timeslots. The device also has two control inputs C0 and C1 for the DMR function allowing four configurations:

(i) 1 8×8 space switch
(ii) 2 4×4 spare switches
(iii) 2×2 spare switches
(iv) 8 1×1 space switches The last option allows use of the device for retiming purposes only by effectively switching off the DMR operation. FIG. 18 illustrates the DMR options provided in which A-H is the time slot range over which an input is connected to an output. The allocation of A to H being the same as that defined above in relation to FIG. 10.

What we claim is:

1. A time division multiplex channel redistribution device having n input paths and n output paths for connection in n interstage links of a multi-stage telecommunication switching network which handles time division multiplexed communication paths and uses digital switching modules, wherein the device comprises n multiplexors (MUX1-MUX8) each having one output and n inputs (A-H), each multiplexor providing one discrete output path (1-8) for the device and wherein each input path (1-8) is connected to a respective input of each multiplexor, said multiplexors being adapted to be controlled to connect a selected input path to a corresponding output path in accordance with address information fed to the multiplexors from a cyclic address generator (CAG) in the device, said cyclic address generator being pre-programmed with a fixed channel allocation address pattern arranged such that the channels on each input path are distributed equally over the output paths without changing the position of the channels within a multiplexed frame.

2. A device according to claim 1 in which the multiplexors include time alignment elements on all input paths.

3. A device according to claim 2 in which the time alignment elements are arranged to align the incoming data using both bit and frame clock signals.

4. A device according to claim 3 in which the frame and bit clock signals are fed from an exchange clock generating circuit by way of separate control inputs for both receive and transmit clocks.

5. A telecommunications switching network comprising 4n+1 total switching stages where n is greater than zero, said stages being arranged to have alternate switching stages using the digital switching modules and time division multiplex channel redistribution devices according to claim 1.

6. A time division multiplex channel redistribution device having n input paths and n output paths for connection in n interstage links of a multi-stage telecommunication switching network which handles time division multiplexed communication paths and uses digital switching modules, wherein the device comprises n multiplexors each having one output and n inputs (A-H), each said multiplexor providing one discrete output path (1-8) for the device and wherein each input device (1-8) is connected to a respective input of each multiplexor, said multiplexors being adapted to be controlled to connect a selected input path to a corresponding output path in accordance with address information fed to the multiplexors from a cyclic address generator (CAG) in the device, said cyclic address generator being pre-programmed with one of a number of selectable channel allocation patterns.

7. A device according to claim 6 in which one of the selectable patterns is arranged to provide full availability between the input and output paths to provide an n×n space switch.

8. A device according to claim 6 in which one of the selectable patterns segregates the input and output paths into two corresponding groups and is arranged to provide full availability between the input and output paths of a group to provide two separate n/2×n/2 space switches.

9. A device according to claim 6 in which a one of the selectable patterns segregates the input and output paths into four groups and is arranged to provide full availability between the input and output paths of a group to provide four separate n/4×n/4 space switches.

10. A device according to claim 6 in which an alternative one of the selectable patterns segregates the input and output paths so that there is dedicated connection between corresponding input and output paths on an exclusive basis to provide eight 1×1 space switches.

* * * * *